United States Patent
Higashiyama et al.

(10) Patent No.: US 6,228,156 B1
(45) Date of Patent: May 8, 2001

(54) WATER-BASED INK FOR INK JET PRINTING AND INK JET PRINTING METHOD

(75) Inventors: Shunichi Higashiyama, Yokkaichi; Masaya Fujioka, Nagoya, both of (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/392,730

(22) Filed: Sep. 9, 1999

(30) Foreign Application Priority Data

Sep. 18, 1998 (JP) .................................................. 10-264328
Sep. 22, 1998 (JP) .................................................. 10-268199

(51) Int. Cl.$^7$ .................................................. C09D 11/00
(52) U.S. Cl. .................................... 106/31.27; 106/31.43; 106/31.58
(58) Field of Search .............................. 106/31.27, 31.58, 106/31.43

(56) References Cited

U.S. PATENT DOCUMENTS

| | | | |
|---|---|---|---|
| 5,268,027 | * 12/1993 | Chan et al. | 106/31.58 |
| 5,273,573 | * 12/1993 | Kappele | 106/31.58 |
| 5,382,283 | * 1/1995 | Yui et al. | 106/31.58 |
| 5,389,131 | * 2/1995 | Colt et al. | 106/31.58 |
| 5,416,145 | * 5/1995 | Askeland et al. | 106/31.43 |
| 5,429,671 | * 7/1995 | Yamamoto | 106/31.58 |
| 5,431,722 | * 7/1995 | Yamashita et al. | 106/31.58 |

* cited by examiner

*Primary Examiner*—Helene Klemanski
*Assistant Examiner*—Veronica F. Faison
(74) *Attorney, Agent, or Firm*—Oliff & Berridge, PLC

(57) ABSTRACT

Color Index Number Direct Red 227 (1% by weight), diethylene glycol (28% by weight), triethylene glycol monomethyl ether (6% by weight) and purified water (65% by weight) were mixed and stirred sufficiently, and then the mixture was filtered using a 0.8 μm membrane filter to prepare a water-based ink. Tests for evaluating the ink ejection stability were conducted at 5° C., 25° C. and 40° C. using the prepared ink in an on-demand type multiple-head printer where printing is performed by ejecting ink droplets from a printhead, and the ink channel geometry and drive conditions were adjusted such that the ink viscosity at 25° C. would be the optimum ink viscosity. In each of the evaluation tests, favorable results were obtained.

20 Claims, 1 Drawing Sheet

WATER-BASED INK FOR INK JET PRINTING AND INK JET PRINTING METHOD

BACKGROUND OF THE INVENTION

1. Field of Invention

This invention relates to an ink jet printing method in which a water-based ink comprising, as essential constituents, water, a water-soluble organic solvent, and a water-soluble dye is ejected as minute ink droplets to perform printing.

2. Description of Related Art

Generally, in a known ink jet printing method, ink droplets are formed by various ink ejecting methods and a portion or all of the ink droplets are sprayed onto a printing medium such as paper to perform printing. There are several ink ejecting methods, such as, a method for electrostatically sucking ink, a method for mechanically oscillating or displacing ink by use of piezoelectric elements, and a method for heating ink to form an air bubble and ejecting ink by pressure built up by the air bubble.

Water-based inks, which use water as a main solvent, have been developed increasingly for use in such an ink jet printing method.

A water-based ink for ink jet printing is required not to clog ink nozzles at the tip of a printhead or an ink channel of an ink jet printer, to allow stable ink ejection, and to produce a bright-colored and high-density printed image.

As a coloring agent for the water-based ink used for ink jet printing, a water-soluble dye is generally used. Since the water-soluble dye dissolves completely in water, if impurities contained therein are reduced below a certain amount, the dye-containing ink is unlikely to clog the tip of the printhead or the ink channel of the ink jet printer, ensuring the production of bright-colored high-density prints. For this reason, various water-based inks that use a highly purified water-soluble dye as a coloring agent are commercially available for use with ink jet printers.

Since the environmental temperature at which ink jet printers are used is generally in a range from 5 to 40° C., stable ink ejection and normal printing operation over such a temperature range are prerequisites for proper ink jet printing.

In addition, the ink jet printer that uses the water-based solvent is generally provided with a capping mechanism. Orifices of the printhead, when not in use, are covered by a cap to be hermetically sealed. This mechanism is provided for preventing clogging of ink nozzles and improper ink droplet trajectory due to increased ink viscosity and hardened ink at the tips of the nozzles. This capping mechanism functions effectively under usual service conditions.

However, when printing is performed under low temperature conditions using a conventional water-based ink for ink jet printing, the ink viscosity increases, and no or unstable ink ejection is caused. On the other hand, under high temperature conditions, the ink viscosity decreases, and ink splashing is caused. Thus, it is hard to produce high quality prints by normal ink ejection under low or high temperature conditions.

Further, under abnormal conditions, for example, where the printhead is left not covered by the nozzle cap for a long time, clogging of ink nozzles occurs due to increased ink viscosity, deposited ink, or hardened ink, and normal ink ejection is hardly restored.

If the temperature of the entire printhead is controlled to maintain the ink viscosity properly, the above-described problems can be solved. In this case, however, the printer will be complicated in structure and its price will increase.

An object of the present invention is therefore to solve the above-mentioned problems and to provide a water-based ink for ink jet printing and an ink jet printing method using the water-based ink, in which the ink allows normal ink ejection over an extended temperature range to produce high quality prints. Another object of the present invention is to provide a water-based ink for ink jet printing and an ink jet printing method using the water-based ink, in which the ink can readily be restored to the state ready for normal ejection even under an abnormal condition where the ink nozzles are left not covered by the cap for a long time.

SUMMARY OF THE INVENTION

A water-based ink according to the present invention is prepared such that the ink viscosity at 5° C. is 3 or less times that at 25° C. and the ink viscosity at 40° C. is 0.5 or more times that at 25° C. If printing is performed using such an ink in various types of ink jet printers, normal ink ejection can be achieved over an extended temperature range and high quality prints can be produced without the need for a modification of the printers.

Further, a water-based ink according to the present invention is prepared such that the ink remaining after its volatile constituents evaporate is liquid at room temperature and such that the viscosity of the remaining ink is 10 or less times the viscosity of the original ink before its volatile constituents evaporate. If printing is performed using such an ink in an ink jet printer, stable ink ejection can be achieved under normal conditions. In addition, even under an abnormal condition where the nozzles of the printhead are left not covered by the cap, the ink can readily be restored to the state ready for normal ejection, and high quality prints can be produced.

BRIEF DESCRIPTION OF THE DRAWING

A preferred embodiment of the present invention will be described in detail with reference to the following FIGURE wherein.

DETAILED DESCRIPTION OF PREFERRED EMBODIMENTS

First Embodiment

Figure 1:
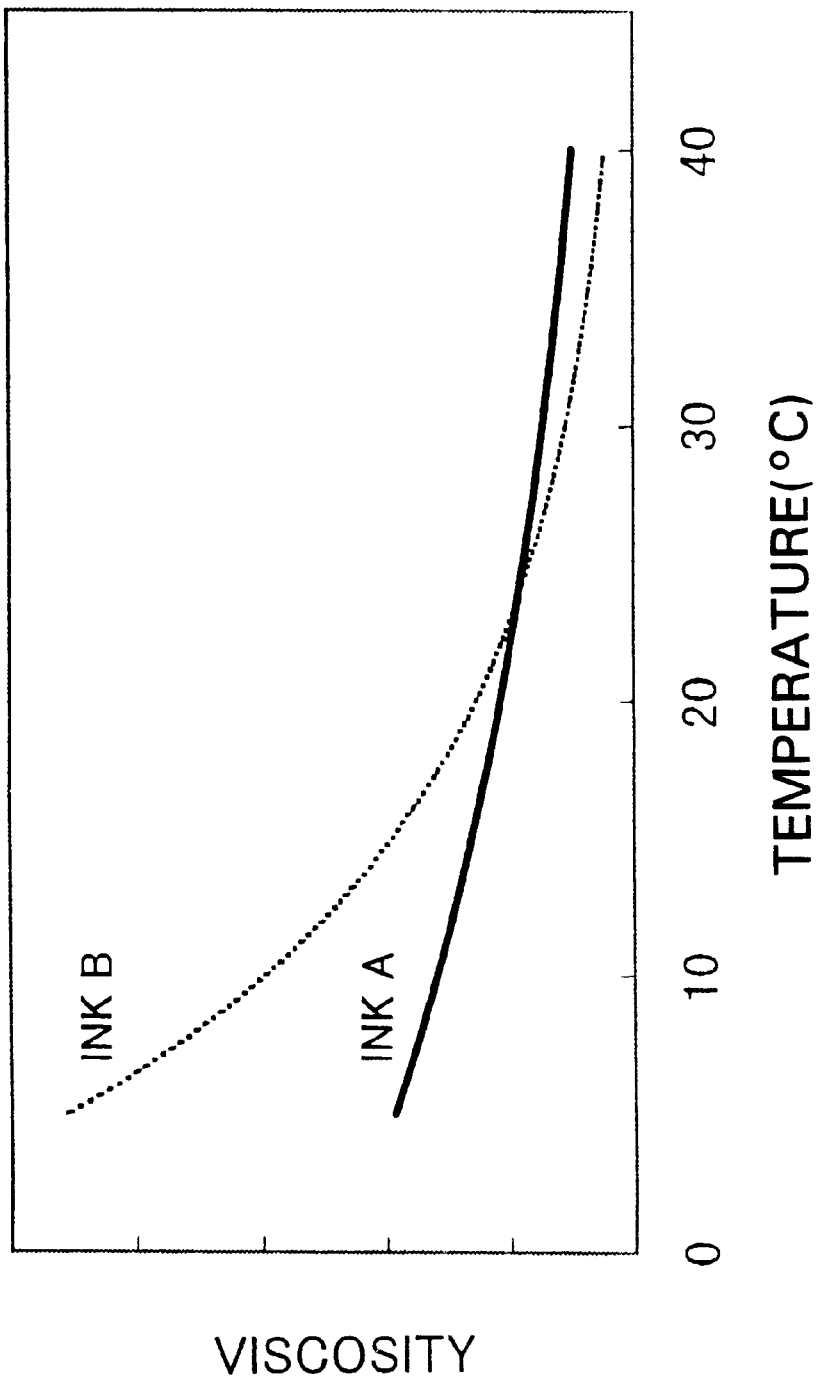
FIG. 1 is a diagram showing the relationship between the ink viscosity and the temperature, one ink changing drastically and the other ink changing modestly in viscosity with temperature.

A first embodiment according to the present invention will be described below.

The provable causes for an ink jet printer using a typical water-based ink to fail to do normal ink ejection is that the ink viscosity changes with temperature and becomes out of its optimum viscosity range, which is determined according to the properties of the printhead.

The ink viscosity is generally adjusted to an optimum value at a room temperature of 25° C. according to the properties of the printhead. Therefore, it is preferable that the ink viscosity fluctuate as little as possible from the optimum value adjusted at room temperature.

As mentioned above, since the ink jet printer is used at an environmental temperature of approximately 5 to 40° C., changes in ink viscosity should be controlled over this temperature range.

FIG. 1 is a diagram showing the relationship between the ink viscosity and the temperature. In FIG. 1, ink A represents an ink, the viscosity of which changes modestly with temperature while ink B represents an ink, the viscosity of which changes drastically with temperature.

The present inventors have found that if an ink is prepared to have a particular composition, high quality prints can be produced by normal ink ejection over an extended environmental temperature range. The present invention is directed to a composition of a water-based ink used for various types of ink jet printers, where the ink viscosity at 5° C. is 3 or less times the ink viscosity at 25° C. and the ink viscosity at 40° C. is 0.5 or more times the ink viscosity at 25° C.

Specifically, if the ink viscosity at a room temperature of 25° C. is 3 cPs, the ink viscosity at 5° C. should be 9 cPs or less, and the ink viscosity at 40° C. should be 1.5 cPs or more.

Water used in the first embodiment is preferably deionized water (purified water). The water content of the ink is preferably 40% or more by weight of the total weight of the ink in order to maintain the ink at a low viscosity, which is applicable to any type of ink jet printers, and reduces changes in viscosity with temperature.

A water-soluble organic solvent used in the first embodiment is preferably a low volatile solvent because this solvent is mainly used to prevent the ink from being deposited or hardened at the tip of the printhead. To reduce changes in viscosity with temperature, it is more preferable to select a highly polar solvent which has a relatively small molecular weight and dissolves dyes well.

Examples of materials as the water-soluble organic solvent which satisfy the above-described requirements include polyalkylene glycols having a mean (average) molecular weight of 400 or less such as polyethylene glycol; alkylene glycols such as ethylene glycol, propylene glycol, butylene glycol, diethylene glycol, dipropylene glycol, triethylene glycol, tripropylene glycol, 1-, 2-, and 6-hexanetriol, thiodiglycol, 1- and 3-butanediol, 1- and 5-pentanediol, hexylene glycol; glycerine; and pyrrolidones such as 2-pyrrolidone, N-methyl-2-pyrrolidone. These materials can be used alone or two or more materials can be mixed to be used as the water-soluble organic solvent. As used herein, "mean (average) molecular weight" or "molecular weight" means weight average molecular weight.

The content of the water-soluble organic solvent in the ink is from 5 to 40%, preferably from 7 to 40%, and more preferably from 10 to 30% by weight of the total weight of the ink. If the content is less than 5% by weight, the ink may lack wetness and deposition or hardening may be caused. If the content exceeds 40% by weight, the ink viscosity may increase excessively, and as a result no ink ejection may be accomplished or the ink may be slow to be dried.

As a water-soluble dye used in the first embodiment, it is advantageous to use cationic and anionic dyes, such as basic dyes, acid dyes, direct dyes, and reactive dyes. More specifically, examples of materials as the water-soluble dye include Color Index Number Basic Red 1, 1:1, 2, 12, 13, 14, 18, 22, 27, 28, 29, 34, 38, 39, 46, 46:1, 67, 69, 70; Color Index Number Basic Violet 1, 2, 3, 4, 5, 7, 8, 10, 11, 11:1, 20, 33; Color Index Number Basic Blue 3, 6, 7, 9, 11, 12, 16, 17, 24, 26, 41, 47, 66; Color Index Number Basic Green 1, 4, 5; Color Index Number Basic Yellow 1, 11, 19, 21, 24, 25, 28, 29, 36, 45 ,51, 67, 73; Color Index Number Basic Orange 14, 21, 22, 32; Color Index Number Basic Brown 1, 4; Color Index Number Basic Black 17, 19, 32, 51, 71, 108, 146, 154, 168; Color Index Number Direct Blue 6, 22, 25, 71, 86, 90, 106, 199; Color Index Number Direct Red 1, 4, 17, 28, 83, 227; Color Index Number Basic Yellow 12, 24, 26, 86, 98, 132, 142; Color Index Number Direct Orange 34, 39, 44, 46, 60; Color Index Number Direct Violet 47, 48; Color Index Number Direct Brown 109; Color Index Number Direct Green 59; Color Index Number Acid Black 2, 7, 24, 26, 31, 52, 63, 112, 118; Color Index Number Acid Blue 9, 22, 40, 59, 93, 102, 104, 113, 117, 120, 167, 229, 234; Color Index Number Acid Red 1, 6,32,37,51, 52, 80, 85, 87, 92, 94, 115, 181, 256, 289, 315, 317; Color Index Number Acid Yellow 11, 17, 23, 25, 29, 42, 61, 71; Color Index Number Acid Orange 7,19; Color Index Number Acid Violet 49; Color Index Number Hood Black 1, 2; and Color Index Number Reactive Red 180. Other dyes than listed above may be used.

In addition, a mixture of two or more kinds of dyes can be used as the water-soluble dye. In this case, a desired color hard to obtain by one dye can be obtained. Although the content of the water-soluble dye varies over a wide range depending on the desired color and density, it preferably lies in a range from 0.01 to 7%, and may preferably in a range from 0.1 to 5% by weight of the total weight of the ink.

In order that the ink viscosity at 5° C. is 3 or less times the viscosity at 25° C. and that the viscosity at 40° C. is 0.5 or more times the viscosity at 25° C., it is effective, first of all, to adjust the proportion of constituents, including the water-soluble dye, which are solid at room temperature, to preferably be at least 7% or less by weight. Second, it is effective to select, as constituents which are liquid at room temperature, materials having a relatively low viscosity and a low molecular weight.

Although the basic composition used in the first embodiment is as described above, various other constituents, such as a penetrant, a resin binder, a dispersant, a surface active agent, a viscosity modifier, a surface tension modifier, a pH modifier, a dye melting agent, and an antiseptic and mildew-proofing agent can be added, if required.

As the penetrant, it is advantageous to use polyalcohol monoalkylethers with a vapor pressure of 0.1 mmHg or less at 20° C. Polyalcohol monoalkylethers effectively speed up ink penetration into the paper, make the ink on the paper dried quickly, and prevent breeding (blurring on the border of different colors) due to the slowly dried ink as well as feathering (blurring along paper fibers) developed upon ink penetration.

Examples of polyalcohol monoallkylethers include diethylene glycol monomethyl ether (with a vapor pressure of 0.1 mmHg at 20° C.), diethylene glycol monobutyl ether (with a vapor pressure of 0.01 mmHg at 20° C.), diethylene glycol monoisobutyl ether (with a vapor pressure of 0.01 mmHg at 20° C.), dipropylene glycol monomethyl ether (with a vapor pressure of 0.06 mmHg at 20° C.), dipropylene glycol monopropyl ether (with a vapor pressure of 0.02 mmHg at 20° C.), dipropylene glycol monoisopropyl ether (with a vapor pressure of 0.05 mmHg at 20° C.), dipropylene glycol monobutyl ether (with a vapor pressure of 0.05 mmHg at 20° C. ), triethylene glycol monomethyl ether (with a vapor pressure of less than 0.01 mmHg at 20° C.), triethylene glycol monobutyl ether (with a vapor pressure of less than 0.01 mmHg at 20° C.), tripropylene glycol monomethyl ether (with a vapor pressure of 0.02 mmHg at 20° C.), and tripropylene glycol monobutyl ether (with a vapor pressure of less than 0.01 mmHg at 20° C.).

Typical polyalcohol alkylethers have their own particular odor. If polyalcohol alkylethers with a vapor pressure of more than 0.1 mmHg at 20° C. are used for the ink, the ink itself may be offensive in odor and unsuitable for office or home use. On the other hand, since the above-listed polyalcohol monoalkylethers are as low as 0.1 mmHg in vapor pressure at 20° C., if they are used for the ink, the ink will be less offensive in odor.

Further, among the above-listed polyalcohol alkylethers, polyalcohol alkylethers with a vapor pressure of less than 0.01 mmHg at 20° C. are particularly neutral in odor and advantageously used for the ink. The content of polyalcohol alkylether in the ink is preferably from 3 to 15% by weight of the total weight of the ink. If the content is less than 3% by weight, the ink may be slow to penetrate into the paper, resulting in slow drying and bleeding. If the content is more than 15% by weight, the ink may penetrate massively to the back of the paper, resulting in feathering.

Monatomic alcohols, such as ethanol and isopropyl alcohol, may be used to control the ink penetration into the paper and the ink drying characteristic.

When the ink is used for an ink jet printer in which ink is ejected by the action of thermal energy, thermal properties of the ink, such as specific heat, coefficient of thermal expansion, and thermal conductivity, may be adjusted.

Since the water-based ink prepared as described above addresses the problems associated with the prior art, if ink jet printing is performed using the ink prepared as described above, high quality prints can be produced by normal ink ejection over an extended temperature range without the need for a modification of the printer.

EXAMPLES

Examples according to the first embodiment of the present invention will be described below. A percentage (%) in the following description refers to a percentage by weight.

Example 1

| Ink Composition | |
| --- | --- |
| Color Index Number Direct Red 227 | 1% |
| diethylene glycol | 28% |
| triethylene glycol monomethyl ether | 6% |
| purified (deionized) water | 65% |

The above-listed materials were mixed and stirred sufficiently and then the mixture was filtered using a 0.8 μm membrane filter to prepare an ink.

The viscosity of the ink of example 1 was measured at room temperature (25° C.) using a rotary viscometer, and a value of 3.2 cPs was obtained. The viscosity of the ink at 5° C. was 6.7 cPs, and the viscosity at 40° C. was 2.0 cPs.

Then, the following evaluation tests were conducted using the ink prepared as described above in an on-demand type multiple-head printer where thermal energy is applied to the ink in the printhead to produce ink droplets for printing. The ink channel geometry and drive conditions of the printer were adjusted such that the optimum ink viscosity would be 3.1 to 3.3 cPs.

Further, the following evaluation tests were also conducted using the ink prepared as described above, under the same conditions as in the above-described printer, in an on-demand type multiple-head printer where pressure generated due to the oscillation of piezoelectric elements is applied to the ink to produce ink droplets for printing.

In each of the evaluation tests, favorable results were obtained.

(Evaluation Test 1) Ink Ejection Stability: 24-hour continuous ink ejection and then 2-minute intermittent ink ejection were performed at room temperature (25° C.), at 5° C., and at 40° C., respectively.

With the ink of example 1, high quality prints could be produced in a stable manner at all times under all conditions.

(Evaluation Test 2) Ink Ejection Stability 2: 12-hour continuous ink ejection and then 2-minute intermittent ink ejection were performed in the same printer at room temperature (25° C.) and at 5° C., alternately.

With the ink of example 1, high quality prints could be produced in a stable manner at all times under all conditions.

Example 2

| Ink Composition | |
| --- | --- |
| Color Index Number Direct Red 227 | 2% |
| polyethylene glycol (molecular weight 200) | 15% |
| 2-pyrrolidone | 15% |
| triethylene glycol monomethyl ether | 6% |
| polyvinyl pyrrolidone (molecular weight 9000) | 2.5% |
| purified (deionized) water | 59.5% |

The above-listed materials were mixed and stirred sufficiently and then the mixture was filtered using a 0.8 μm membrane filter to prepare an ink.

The viscosity of the ink of example 2 was measured at room temperature (25° C.) using a rotary viscometer, and a value of 4.3 cPs was obtained. The viscosity of the ink at 5° C. was 11 cPs, and the viscosity at 40° C. was 2.6 cPs.

The above-described evaluation tests 1 and 2 were conducted in a printer where the optimum ink viscosity was adjusted in a range from 4.2 to 4.4 cPs. Consequently, favorable results were obtained in each of the evaluation tests, as in example 1.

Comparative Example 1

| Ink Composition | |
| --- | --- |
| Color Index Number Direct Red 227 | 1% |
| polyethylene glycol (molecular weight 600) | 15% |
| triethylene glycol monomethyl ether | 6% |
| purified (deionized) water | 78% |

The above-listed materials were mixed and stirred sufficiently and then the mixture was filtered using a 0.8 μm membrane filter to prepare an ink.

The viscosity of the ink of comparative example 1 was measured at room temperature (25° C.) using a rotary viscometer, and a value of 2.2 cPs was obtained. The viscosity of the ink at 5° C. was 7.2 cPs, and the viscosity at 40° C. was 1.5 cPs.

The evaluation tests 1 and 2 were conducted in a printer where the optimum ink viscosity was adjusted in a range from 2.1 to 2.3 cPs. Consequently, either no ink ejection or improper ink droplet trajectory were observed, but high quality prints could not be produced at 5° C. in each of the evaluation tests 1 and 2.

Comparative Example 2

| Ink Composition | |
|---|---|
| Color Index Number Direct Red 227 | 3% |
| polyethylene glycol (molecular weight 200) | 15% |
| 2-pyrrolidone | 15% |
| triethylene glycol monomethyl ether | 6% |
| polyvinyl pyrrolidone (molecular weight 9000) | 5% |
| purified (deionized) water | 56% |

The above-listed materials were mixed and stirred sufficiently and then the mixture was filtered using a 0.8 μm membrane filter to prepared an ink.

The viscosity of the ink of example 2 was measured at room temperature (25° C.) using a rotary viscometer, and a value of 6.4 cPs was obtained. The viscosity of the ink at 5° C. was 26 cPs, and the viscosity at 40° C. was 2.5 cPs.

The above-described evaluation tests 1 and 2 were conducted in a printer where the optimum ink viscosity was adjusted in a range from 6.3 to 6.5 cPs. Consequently, either no ink ejection or improper ink droplet trajectory were observed frequently, and poor quality prints were produced at 5° C. in each of the evaluation tests 1 and 2.

At 40° C., unstable ink ejection due to ink splashing was observed and poor quality prints were produced.

Table 1 shows the results of the evaluation tests conducted in examples 1 and 2 and in comparative examples 1 and 2.

TABLE 1

| | Evaluation Test 1 | | | Evaluation Test 2 | | |
|---|---|---|---|---|---|---|
| | 5° C. | 25° C. | 40° C. | 25° C., 5° C. | 25° C., 40° C. | 5° C., 40° C. |
| Example 1 | ◎ | ◎ | ◎ | ◎ | ◎ | ◎ |
| Example 2 | ◎ | ◎ | ◎ | ◎ | ◎ | ◎ |
| Comparative Example 1 | Δ | ◎ | ○ | X | ○ | X |
| Comparative Example 2 | X | ◎ | X | X | X | X |

◎ Excellent
○ Good
Δ Not Good
X Bad

As described above, the inks of examples 1 and 2 allow normal ink ejection over an extended temperature range and hence can produce high quality prints.

On the other hand, the inks of examples 1 and 2 worsen the ink ejecting conditions in some cases of the evaluation tests 1 and 2 and hence cannot produce high quality prints.

Second Embodiment

A second embodiment according to the present invention will be described below.

In ink jet printers using a typical water-based ink, the ink viscosity which allows normal ink ejection is approximately from 1 to 10 cPs. However, when ink nozzles at the tip of a printhead are left not covered by a cap or the like for a few days or longer while the printhead is filled with the ink, the ink on the nozzle surface increases in viscosity considerably as its volatile constituents evaporate, and at the worst, the ink might be deposited or hardened. Once the ink becomes excessively high in viscosity, deposited, or hardened, the ink can hardly be restored to the state ready for normal ejection even if the ink is forcibly discharged using a purging device.

The present inventors of the present invention have found that the above-mentioned problems can be solved if a water-based ink is controlled not to be deposited or hardened after the ink is dried, that is after evaporation of its volatile constituents appears to cease, and if controlled such that the increased viscosity of the ink on the nozzle surface is 10 or less times the viscosity of the original ink.

In other words, when the increased viscosity of the ink on the nozzle surface is 10 or less times the viscosity of the normal ink in the printhead, the ink in the printhead and the ink on the nozzle surface are readily mixed and restored to the proper viscosity if sucked from the nozzle side using a conventional purging device, if pressurized to be forcibly discharged from the printhead, or if preliminary ejected from all the nozzles independently of printing operation.

On the other hand, when the viscosity of the ink on the nozzle surface exceeds 10 times that of the normal ink, normal ink ejection can hardly be restored even if a purging device is used. Further, once the ink is deposited or hardened on the nozzle surface, normal ink ejection can hardly be restored by any means, unless otherwise the printhead is replaced with a new one.

It is noted that the viscosity of the ink dried on the nozzle surface at the tip of the printhead is equal to the viscosity of the ink which is stored in bulk (stored in a liquid state) and from which volatile constituents evaporate until evaporation appears to cease. Therefore, the viscosity of the ink dried on the nozzle surface can be obtained by measuring the latter.

Water used in the second embodiment is preferably deionized water (purified water). The water content is preferably more than 40% by weight of the total weight of the ink so as to keep the ink viscosity under normal conditions low enough to allow normal ink ejection.

The water-soluble organic solvent is used in the second embodiment mainly for preventing the ink from being deposited or hardened at the tip of the printhead. Accordingly, it is preferable to select, as the water-soluble organic solvent, a solvent which has a low volatility and dissolves dyes well.

Examples of materials as the water-soluble organic solvent include polyalkylene glycols having a molecular weight of 400 or less such as polyethylene glycol; alkylene glycols such as ethylene glycol, propylene glycol, butylene glycol, diethylene glycol, dipropylene glycol, triethylene glycol, tripropylene glycol, 1-, 2-, and 6-hexanetriol, thiodiglycol, 1- and 3-butanediol, 1- and 5-pentanediol, hexylene glycol; glycerine; and pyrrolidones such as 2-pyrrolidone, N-methyl-2-pyrrolidone. One material or a mixture of two or more materials can be used as the water-soluble organic solvent.

The content of the water-soluble organic solvent in the ink is preferably from 5 to 40%, more preferably from 7 to 40%, and even more preferably from 10 to 30% by weight of the total weight of the ink. If the content is less than 5% by weight, the ink may lack wetness and deposition or hardening may be caused. If the content exceeds 40% by weight, the ink viscosity may increase excessively, and no ink ejection may be achieved or the ink may be slow to be dried.

As a water-soluble dye used in the second embodiment, it is advantageous to use cationic and anionic dyes, such as basic dyes, acid dyes, direct dyes, and reactive dyes. More specifically, examples of materials as the water-soluble dye include Color Index Number Basic Red 1, 1:1, 2, 12, 13, 14, 18, 22, 27, 28, 29, 34, 38, 39, 46, 46:1, 67, 69, 70; Color Index Number Basic Violet 1, 2, 3, 4, 5, 7, 8, 10, 11, 11:1, 20, 33; Color Index Number Basic Blue 3, 6, 7, 9, 11, 12, 16, 17, 24, 26, 41, 47, 66; Color Index Number Basic Green 1, 4, 5; Color Index Number Basic Yellow 1, 11, 19, 21, 24, 25, 28, 29, 36, 45 ,51, 67, 73; Color Index Number Basic Orange 14, 21, 22, 32; Color Index Number Basic Brown 1, 4; Color Index Number Basic Black 17, 19, 32, 51, 71, 108, 146, 154, 168; Color Index Number Direct Blue 6, 22, 25, 71, 86, 90, 106, 199; Color Index Number Direct Red 1, 4, 17, 28, 83, 227; Color Index Number Direct Yellow 12, 24, 26, 86, 98, 132, 142; Color Index Number Direct Orange 34, 39, 44, 46, 60; Color Index Number Direct Violet 47, 48; Color Index Number Direct Brown 109; Color Index Number Direct Green 59; Color Index Number Acid Black 2, 7, 24, 26, 31, 52, 63, 112, 118; Color Index Number Acid Blue 9, 22, 40, 59, 93, 102, 104, 113, 117, 120, 167, 229, 234; Color Index Number Acid Red 1, 6, 32, 37, 51, 52, 80, 85, 87, 92, 94, 115, 181, 256, 289, 315, 317; Color Index Number Acid Yellow 11, 17, 23, 25, 29, 42, 61, 71; Color Index Number Acid Orange 7,19; Color Index Number Acid Violet 49; Color Index Number Hood Black 1, 2; and Color Index Number Reactive Red 180. Other dyes than listed above may be used.

In addition, a mixture of two or more kinds of dyes can used as the water-soluble dye. In this case, a desired color hard to obtain by one dye can be obtained. Although the content of the water-soluble dye varies over a wide range depending on the desired color and density, it preferably lies in a range from 0.01 to 7%, and more preferably in a range from 0.1 to 5% by weight of the total weight of the ink.

In order that the ink viscosity after its volatile constituents evaporate is 10 or less times the ink viscosity before the evaporation, it is effective to adjust the proportion of constituents, including the water-soluble dye, which are solid at room temperature, to preferably be at least 7% or less by weight. Also, it is effective to select, as constituents that are low in volatility and liquid at room temperature, materials having a relatively low viscosity.

Although the basic composition used in the second embodiment is as described above, various other constituents, such as a penetrant, a resin binder, a dispersant, a surface active agent, a viscosity modifier, a surface tension modifier, a pH modifier, a dye melting agent, and an antiseptic and mildew-proofing agent can be added, if required.

As the penetrant, it is advantageous to use polyalcohol monoalkylethers with a vapor pressure of 0.1 mmHg or less at 20° C. Polyalcohol monoalkylethers effectively speed up ink penetration into the paper, make the ink on the paper dried quickly, and prevent breeding (blurring on the border of different colors) due to the slowly dried ink as well as feathering (blurring along paper fibers) associated with ink penetration.

Examples of polyalcohol monoallkylethers include diethylene glycol monomethyl ether (with a vapor pressure of 0.1 mmHg at 20° C.), diethylene glycol monobutyl ether (with a vapor pressure of 0.01 mmHg at 20° C.), diethylene glycol monoisobutyl ether (with a vapor pressure of 0.01 mmHg at 20° C.), dipropylene glycol monomethyl ether (with a vapor pressure of 0.06 mmHg at 20° C.), dipropylene glycol monopropyl ether (with a vapor pressure of 0.02 mmHg at 20° C.), dipropylene glycol monoisopropyl ether (with a vapor pressure of 0.05 mmHg at 20° C.), dipropylene glycol monobutyl ether (with a vapor pressure of 0.05 mmHg at 20° C.), triethylene glycol monomethyl ether (with a vapor pressure of less than 0.01 mmHg at 20° C.), triethylene glycol monobutyl ether (with a vapor pressure of less than 0.01 mmHg at 20° C. ), tripropylene glycol monomethyl ether (with a vapor pressure of 0.02 mmHg at 20° C.), and tripropylene glycol monobutyl ether (with a vapor pressure of less than 0.01 mmHg at 20° C.).

Typical polyalcohol alkylethers have their own particular odor. If polyalcohol alkylethers with a vapor pressure of more than 0.1 mmHg at 20° C. are used for the ink, the ink itself may be offensive in odor and unsuitable for office or home use. On the other hand, since the vapor pressure of the above-listed polyalcohol alkylethers is as low as 0.1 mmHg at 20° C., if they are used for the ink, the ink will be less offensive in odor.

Further, among the above-listed polyalcohol alkylethers, polyalcohol alkylethers with a vapor pressure of less than 0.01 mmHg at 20° C. are particularly neutral in odor and advantageously used for the ink.

The content of polyalcohol alkylether in the ink of the second embodiment is preferably from 3 to 15% by weight of the total weight of the ink. If the content is less than 3% by weight, the ink may be slow to penetrate into the paper, resulting in slow drying and bleeding. If the content is more than 15% by weight, the ink may penetrate massively to the back of the paper, resulting in feathering.

Monatomic alcohols, such as ethanol and isopropyl alcohol, may be used to control the ink penetration into the paper and the ink drying characteristic.

When the ink is used for an ink jet printer in which ink is ejected by the action of thermal energy, thermal properties of the ink, such as specific heat, coefficient of thermal expansion, and thermal conductivity, may be adjusted.

In the second embodiment, the water-based ink prepared as described above and the ink jet printing method using the water-based ink address the problems associated with the prior art. If printing is performed using the ink prepared as described above in the ink jet printer, excellent ink ejection stability can be obtained. Further, even under an abnormal condition where the nozzles of the printhead are left not covered by the cap, the ink can readily be restored to the state ready for normal ink ejection.

EXAMPLES

Examples according to the second embodiment of the present invention will be described below. A percentage (%) in the following description refers to a percentage by weight.

Example 1

| Ink Composition | |
|---|---|
| Color Index Number Direct Red 227 | 1% |
| diethylene glycol | 28% |
| triethylene glycol monomethyl ether | 6% |
| purified (deionized) water | 65% |

The above-listed materials were mixed and stirred sufficiently and then the mixture was filterred using a 0.8 μm membrane filter to prepare an ink.

The viscosity of the ink of example 1 was measured at room temperature (25° C.) using a rotary viscometer, and a value of 3.2 cPs was obtained.

50 g of the ink was measured out to a glass bottle, and the bottle was left uncovered for 30 days in a container where the temperature is kept constant at 50° C. and the relative humidity is kept constant at 50%. Then, the viscosity of the remaining ink was measured using a rotary viscometer at 25° C., and a value of 25 cPs was obtained. The contents of the remaining ink were observed using a microscope, and no deposits or the like were found.

The following evaluation tests 1 and 2 were conducted using the ink of example 1 in an on-demand type multiple-head printer (ink jet orifice diameter: 35 μm, heating element resistance: 150Ω, drive voltage: 30 V, frequency: 2 KHz) where thermal energy is applied to the ink in the printhead to produce ink droplets for printing, and also in an on-demand type multiple-head printer (ink jet orifice diameter: 40 μm, drive voltage: 30 V, frequency: 10 KHz) where pressure generated due to the oscillation of piezoelectric elements is applied to the ink to produce ink droplets for printing. In each of the evaluation tests, favorable results were obtained.

(Evaluation Test 1) Ink Ejection Stability 1: 24-hour continuous ink ejection were performed at room temperature (25° C.), at 5° C., and at 40° C., respectively.

With the ink of example 1, high quality prints could be produced in a stable manner at all times under all temperature conditions.

(Evaluation Test 2) Ink Ejection Restoration: An ink was supplied to the printhead and left not covered by the nozzle cap for 2 months, and then the ink ejecting conditions were examined.

With the ink of example 1, the ink was restored to the state ready for normal ejection after approximately 1000 times of preliminary ink ejections, and stable and uniform prints could be produced.

Example 2

| Ink Composition | |
|---|---|
| Color Index Number Direct Red 227 | 2% |
| polyethylene glycol (molecular weight 200) | 15% |
| 2-pyrrolidone | 15% |
| triethylene glycol monomethyl ether | 6% |
| polyvinyl pyrrolidone (molecular weight 9000) | 2.5% |
| purified (deionized) water | 59.5% |

The above-listed materials were mixed and stirred sufficiently and then the mixture was filtered using a 0.8 μm membrane filter to prepare an ink.

The viscosity of the ink of example 2 was measured at room temperature (25° C.) using a rotary viscometer, and a value of 4.3 cPs was obtained. 50 g of the ink was measured out to a glass bottle, and the bottle was left uncovered for 30 days in a container where the temperature is kept constant at 50° C. and the relative humidity is kept constant at 50%. Then, the viscosity of the remaining ink was measured using a rotary viscometer at 25° C., and a value of 42 cPs was obtained. The contents of the remaining ink were observed using a microscope, and no deposits or the like were found.

The evaluation tests 1 and 2 were conducted using the ink of example 2, in the same manner as in example 1. In evaluation test 1, the ink of this example provided favorable results, as did the ink of example 1. In evaluation test 2, the ink left uncovered for 2 months was restored to the state ready for normal ejection when forcibly discharged using a purging device, and stable and uniform prints could be produced.

Comparative Example 1

| Ink Composition | |
|---|---|
| Color Index Number Direct Red 227 | 1% |
| polyethylene glycol (molecular weight 600) | 15% |
| triethylene glycol monomethyl ether | 6% |
| purified (deionized) water | 78% |

The above-listed materials were mixed and stirred sufficiently and then the mixture was filtered using a 0.8 μm membrane filter to prepare ink.

The viscosity of the ink of comparative example 1 was measured at room temperature (25° C.) using a rotary viscometer, and a value of 2.2 cPs was obtained.

In addition, 50 g of the ink was measured out to a glass bottle, and the bottle was left uncovered for 30 days in a container where the temperature is kept constant at 50° C. and the relative humidity is kept constant at 50%. Then, the viscosity of the remaining ink was measured using a rotary viscometer at 25° C., and a value of 60 cPs was obtained. The contents of the remaining ink were observed using a microscope, and no deposits or the like were found.

The evaluation tests 1 and 2 were conducted using the ink of this example in the same manner as in example 1. In evaluation test 1, the ink of this example provided favorable results, as did the ink of example 1. In evaluation test 2, however, the ink left uncovered for 2 months could not be restored to the state ready for normal ejection even by being forcibly discharged using a purging device, and as a result either no ink ejection or improper ink droplet trajectory were observed.

Comparative Example 2

| Ink Composition | |
|---|---|
| Color Index Number Direct Red 227 | 3% |
| polyethylene glycol (molecular weight 200) | 15% |
| 2-pyrrolidone | 15% |
| triethylene glycol monomethyl ether | 6% |
| polyvinyl pyrrolidone (molecular weight 9000) | 5% |
| purified (deionized) water | 56% |

The above-listed materials were mixed and stirred sufficiently and then the mixture was filtered using a 0.8 μm membrane filter to prepare ink.

The viscosity of the ink of comparative example 2 was measured at room temperature (25° C.) using a rotary viscometer, and a value of 6.4 cPs was obtained.

In addition, 50 g of the ink was measured out to a glass bottle, and the bottle was left uncovered for 30 days in a container where the temperature is kept constant at 50° C. and the relative humidity is kept constant at 50%. The remaining ink was visually observed, and a dried surface was found. The contents of the remaining ink were also observed using a microscope, and deposits were found.

The evaluation tests 1 and 2 were conducted using the ink of this example in the same manner as in example 1. In evaluation test 1, unstable ink ejection was observed at 5° C. In evaluation test 2, the ink left uncovered for 2 months could not be restored to the state ready for normal ejection even by being forcibly discharged using a purging device, and occurrences of no ink ejections were frequently observed.

The results of the above-described evaluation tests are shown in Table 2.

TABLE 2

|  | Evaluation Test 1 | Evaluation Test 2 |
|---|---|---|
| Example 1 | ◎ | ◎ |
| Example 2 | ◎ | ◎ |
| Comparative Example 1 | ◎ | Δ |
| Comparative Example 2 | Δ | X |

◎ Excellent
○ Good
Δ Not Good
X Bad

As described above, the inks of examples 1 and 2 have excellent ink ejection stability. Further, these inks can be restored to the state ready for normal ink ejection even under an abnormal condition where the nozzles of the printhead are left uncovered by the cap, making possible the production of high quality prints in various ink jet printing method.

On the other hand, the inks of comparative examples 1 and 2 raise problems in some conditions of the evaluation tests, and are unlikely to produce high quality prints.

What is claimed is:

1. A water-based ink for ink jet printing which comprises, as essential constituents, water, a water-soluble organic solvent, and a water-soluble dye, wherein a viscosity of said ink at 5° C. is 3 or less times the viscosity of said ink at 25° C. and the viscosity of said ink at 40° C. is 0.5 or more times the viscosity of said ink at 25° C.

2. The water-based ink according to claim 1, wherein the water is deionized water and a water content is 40% or more by weight of a total weight of the ink.

3. The water-based ink according to claim 1, wherein a content of the water-soluble organic solvent is from 5 to 40% by weight of a total weight of the ink.

4. The water-based ink according to claim 3, wherein the water-soluble organic solvent comprises at least one material selected from the group consisting of polyalkylene glycols with a weight average molecular weight of 400 or less, alkylene glycols, glycerine, and pyrrolidones.

5. The water-based ink according to claim 1, wherein a content of the water-soluble dye is from 0.01 to 7% by weight of a total weight of the ink.

6. The water-based ink according to claim 5, wherein the water-soluble dye comprises at least one material selected from the group consisting of basic dyes, acid dyes, direct dyes, and reactive dyes.

7. An ink jet printing method for ejecting a water-based ink for ink jet printing, which comprises, as essential constituents, water, a water-soluble organic solvent, and a water-soluble dye, as minute ink droplets to perform printing, wherein the water-based ink according to claim 1 is used.

8. A water-based ink for ink jet printing which comprises, as essential constituents, water, a water-soluble organic solvent, and a water-soluble dye, wherein the ink remaining after its volatile constituents evaporate is liquid, and a viscosity of the remaining ink is 10 or less times the viscosity of the ink before its volatile constituents evaporate.

9. The water-based ink according to claim 8, wherein the water is deionized water and a water content is 40% or more by weight of a total weight of the ink.

10. The water-based ink according to claim 8, wherein a content of the water-soluble organic solvent is from 5 to 40% by weight of a total weight of the ink.

11. The water-based ink according to claim 10, wherein the water-soluble organic solvent comprises at least one material selected from the group consisting of polyalkylene glycols with a weight average molecular weight of 400 or less, alkylene glycols, glycerine, and pyrrolidones.

12. The water-based ink according to claim 8, wherein a content of the water-soluble dye is from 0.01 to 7% by weight of a total weight of the ink.

13. The water-based ink according to claim 12, wherein the water-soluble dye comprises as least one material selected from the group consisting of basic dyes, acid dyes, direct dyes, and reactive dyes.

14. An ink jet printing method for ejecting a water-based ink for ink jet printing, which comprises, as essential constituents, water, a water-soluble organic solvent, and a water-soluble dye, as minute ink droplets to perform printing, wherein the water-based ink according to claim 8 is used.

15. The water-based ink according to claim 3, wherein a content of the water-soluble organic solvent is from 7 to 40% by weight of a total weight of the ink.

16. The water-based ink according to claim 15, wherein a content of the water-soluble organic solvent is from 10 to 30% by weight of a total weight of the ink.

17. The water-based ink according to claim 5, wherein a content of the water-soluble dye is from 0.1 to 5% by weight of a total weight of the ink.

18. The water-based ink according to claim 10, wherein a content of the water-soluble organic solvent is from 7 to 40% by weight of a total weight of the ink.

19. The water-based ink according to claim 18, wherein a content of the water-soluble organic solvent is from 10 to 30% by weight of a total weight of the ink.

20. The water-based ink according to claim 12, wherein a content of the water-soluble dye is from 0.1 to 5% by weight of a total weight of the ink.

* * * * *